United States Patent [19]
Callahan

[11] Patent Number: 5,548,323
[45] Date of Patent: Aug. 20, 1996

[54] MULTIPLE INPUT PROCESSOR FOR CABLE TELEVISION HEAD END CONTROLLER

[75] Inventor: Martin E. Callahan, Greeley, Nebr.

[73] Assignee: Hollyanne Corp., Greeley, Nebr.

[21] Appl. No.: 220,437

[22] Filed: Mar. 30, 1994

[51] Int. Cl.[6] .................................................. H04N 7/10
[52] U.S. Cl. .............................. 348/9; 348/10; 348/460; 348/484; 455/63
[58] Field of Search ....................... 348/9, 10, 460, 348/484; 340/503, 533, 288; 455/6.3, 4.1, 3.1

[56] References Cited

U.S. PATENT DOCUMENTS

| | | | |
|---|---|---|---|
| 3,035,251 | 5/1962 | Inderwiesen | 340/171 |
| 3,848,193 | 11/1974 | Martin et al. | 325/53 |
| 3,860,746 | 1/1975 | Takeuchi | 178/5.6 |
| 3,886,538 | 5/1975 | Takeuchi | 340/310 R |
| 3,932,858 | 1/1976 | Smith et al. | 340/280 |
| 3,975,583 | 8/1976 | Meadows | 178/5.6 |
| 3,993,955 | 11/1976 | Belcher et al. | 325/308 |
| 4,015,074 | 3/1977 | Inoue et al. | 358/86 |
| 4,057,829 | 11/1977 | Moorehead | 358/86 |
| 4,075,628 | 2/1978 | Masuda et al. | 340/416 |
| 4,139,843 | 2/1979 | Watanabe | 340/505 |
| 4,198,624 | 4/1980 | Watanabe | 340/505 |
| 4,367,548 | 1/1983 | Cotten, Jr, et al. | 370/3 |
| 4,415,771 | 11/1983 | Martinez | 179/5 R |
| 4,476,488 | 10/1984 | Merrell | 358/86 |
| 4,575,750 | 3/1986 | Callahan | 348/9 |
| 4,682,368 | 7/1987 | Takahashi | 455/38 |
| 5,027,400 | 6/1991 | Baji et al. | 380/20 |
| 5,038,402 | 8/1991 | Robbins | 455/3 |

FOREIGN PATENT DOCUMENTS

| | | |
|---|---|---|
| 56-72550 | 6/1981 | Japan . |
| WO84/01873 | 5/1984 | WIPO . |

*Primary Examiner*—Victor R. Kostak
*Assistant Examiner*—Nathan J. Flynn
*Attorney, Agent, or Firm*—Zarley, McKee, Thomte Voorhees & Sease; Mark D. Fredericksen

[57] ABSTRACT

A multiple input processor includes apparatus for receiving inputs from multiple sources and processing the inputs for transmission to receivers along a television cable network. The processor includes an RF modulator to convert audio signals from signal sources to radio frequency signals for broadcasting through the cable TV system. A microcomputer in the processor processes signals received from multiple sources and selectively transmits the signals through the modulator, The processor includes an audio bus interconnecting the signal sources and processor to permit receiving, processing, and transmission of audio signals. A telephone interface is connected to the audio bus to permit transmission of signals from a telephone line to the computer, as a separate signal source, and to permit transmission of signals from the audio bus to the telephone line for reporting and other auditing purposes. A modem is interfaced with the audio bus to permit self-diagnosis and testing, as well as transmission of reports from self-testing.

7 Claims, 23 Drawing Sheets

MULTIPLE INPUT PROCESSOR FOR CABLE TELEVISION HEAD END CONTROLLER

TECHNICAL FIELD

The present invention relates generally to communications apparatus, and more particularly to communications processing apparatus for receiving inputs from multiple sources and transmitting predetermined signals over a television cable network.

BACKGROUND OF THE INVENTION

Cable television systems are well known in the art. Through such systems, a recipient's television receiver may be connected to a cable that connects to the cable company's transmitter. A plurality of television signals are broadcast in the radio frequency range through the cable.

Attempts have been made to send additional messages through such cable systems. For instance, in some prior art systems, a written message appears on the screen of the recipient's receiver. This message may either contain all of the pertinent information that the cable company intends the recipient to receive, or it will instruct the viewer to turn to a specific channel. The intended information will then be viewable on that channel.

Such a system has certain obvious drawbacks. Most important, the receiver must be turned on, or the recipient will not be aware that the cable company has transmitted a message.

To overcome this drawback, the applicant herein provided a communications apparatus suitable for use with a cable television system that would operate even when the recipient's television receiver is deactivated, as more specifically set forth in the applicant's U.S. Pat. No. 4,575,750. The communications system of that patent included a transmission unit which provided at least one recorded audio signal message. The transmission unit would convert the message into a radio frequency signal broadcast through the cable television system without interfering with any signals ordinarily broadcast therethrough. A receiver is provided at each cable television subscriber's location for receiving the radio frequency signal from the transmitter and for converting that signal into an audible signal. The receiver included a transducer which was separate from the transducer elements ordinarily connected to the cable television system, to permit an audible signal to be produced without requiring that the television set be turned on.

While the communications system of U.S. Pat. No. 4,575,750 has worked well for its intended purpose, it would only send one specific signal as a result of a single input at the cable head end. Thus, the prior art communications system could not receive input from multiple sources and process that information to produce an appropriate alarm signal.

The capability of receiving alarm activation inputs from several sources permits the transmission of a wide variety of warning messages. For example, severe weather warnings could be issued to subscribers in a threatened area. Civil defense messages or environmental health warnings could also be received and delivered through a single system. Manual triggering of recorded voice messages could be transmitted through a telephone input.

Use of multiple sources of input leads to several other features not present in the prior art. First, a priority structure is desirable in the event of simultaneous activation of two or more inputs. Second, the multiple input processor should have self-monitoring ability as well as the capability of issuing reports of its functioning. In addition, communications via a standard modem permits reporting through a telephone interface as well as control of the processor via a telephone interface.

SUMMARY OF THE INVENTION

It is therefore a general object of the present invention to provide a multiple input processor for a cable television network communications system.

Another object of the present invention is to provide a multiple input processor for cable head end controllers which will receive and process signals from radio frequency inputs, as well as telephone inputs.

Still another object is to provide a multiple input processor with its own system computer for control processing and decision activities.

Yet another object is to provide a multiple input processor which is capable of prioritizing input signals simultaneously received from multiple sources.

Still another object of the present invention is to provide a multiple input processor which is self-monitoring and capable of issuing audit reports of its self-monitoring function.

Still another object is to provide a multiple input processor which provides an output signal to an audio speaker, to a cable television transmission line, and/or to a telephone interface.

These and other objects will be apparent to those skilled in the art.

The multiple input processor of the present invention includes apparatus for receiving inputs from multiple sources and processing the inputs for transmission to receivers along a television cable network. The processor includes an RF modulator to convert audio signals from signal sources to radio frequency signals for broadcasting through the cable TV system. A microcomputer in the processor processes signals received from multiple sources and selectively transmits the signals through the modulator. The processor includes an audio bus interconnecting the signal sources and processor to permit receiving, processing, and transmission of audio signals. A telephone interface is connected to the audio bus to permit transmission of signals from a telephone line to the computer, as a separate signal source, and to permit transmission of signals from the audio bus to the telephone line for reporting and other auditing purposes. A modem is interfaced with the audio bus to permit self-diagnosis and testing, as well as transmission of reports from self-testing.

DESCRIPTION OF THE PREFERRED EMBODIMENT

Figure 1:
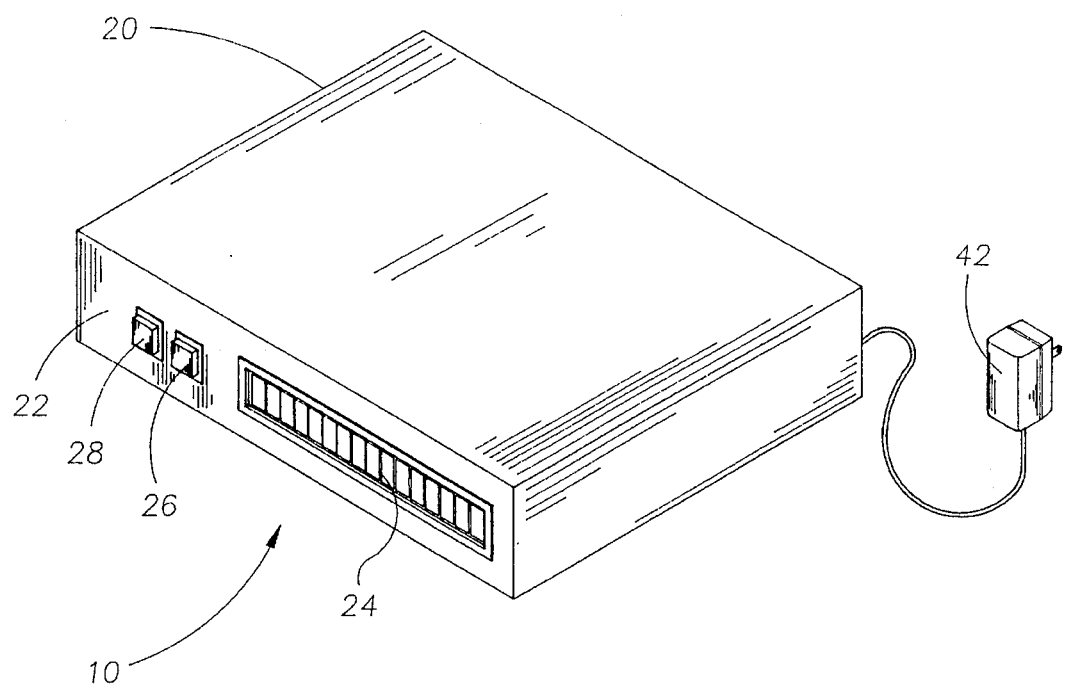
FIG. 1 is a front perspective view of the multiple input processor (MIP) of the present invention.
Figure 2:
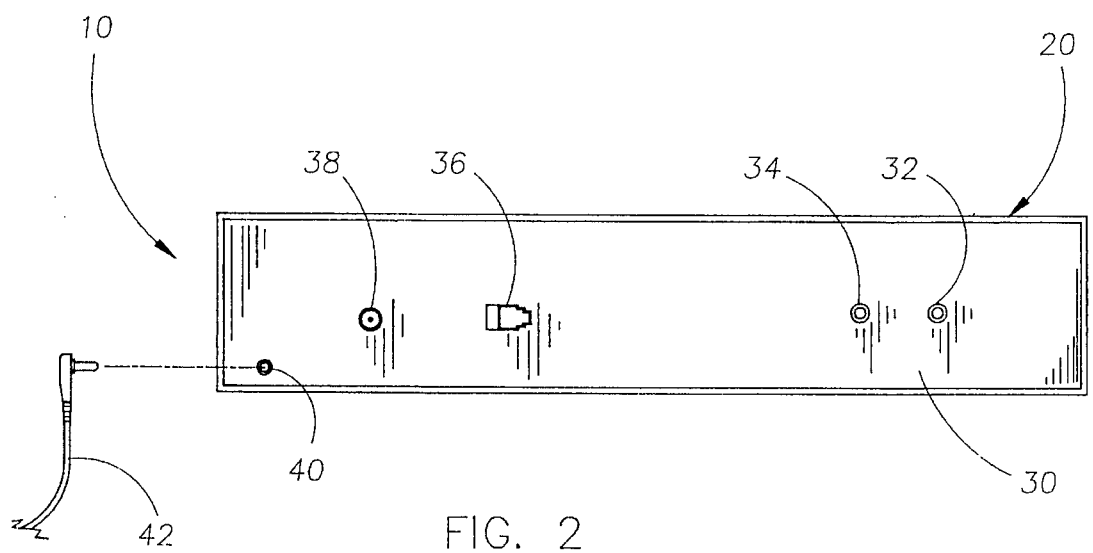
FIG. 2 is a rear elevational view of the MIP.

Referring now to the drawings, in which similar or corresponding parts are identified with the same reference numerals, and more particularly to FIG. 1, the multiple input processor (MIP) 10 is preferably mounted within a rack-mounted case 20, as shown in FIGS. 1 and 2, of a metal material to aid in signal shielding. Case 20 includes a front panel 22 having an LCD display 24 and a pair of push-type keys 26 and 28 to permit manual human input. As shown in FIG. 2, the rear panel 30 of case 20 includes a pair of RF antenna connectors 32 and 34, a standard telephone connector 36, a standard RF signal output connector 38 and a power jack connector 40. A power pack 42 converts 115 volt AC electrical current to 9 volt DC for transmission to power pack connector 40. In this way, no dangerous voltages exist in the MIP unit while in operation.

As shown in FIG. 1, push buttons 26 and 28 allow a human operator to perform certain functions, such as: (1) set time and date; (2) activate alarms; (3) seek unit status; (4) change unit configuration; and (5) diagnose problems.

Figure 3:
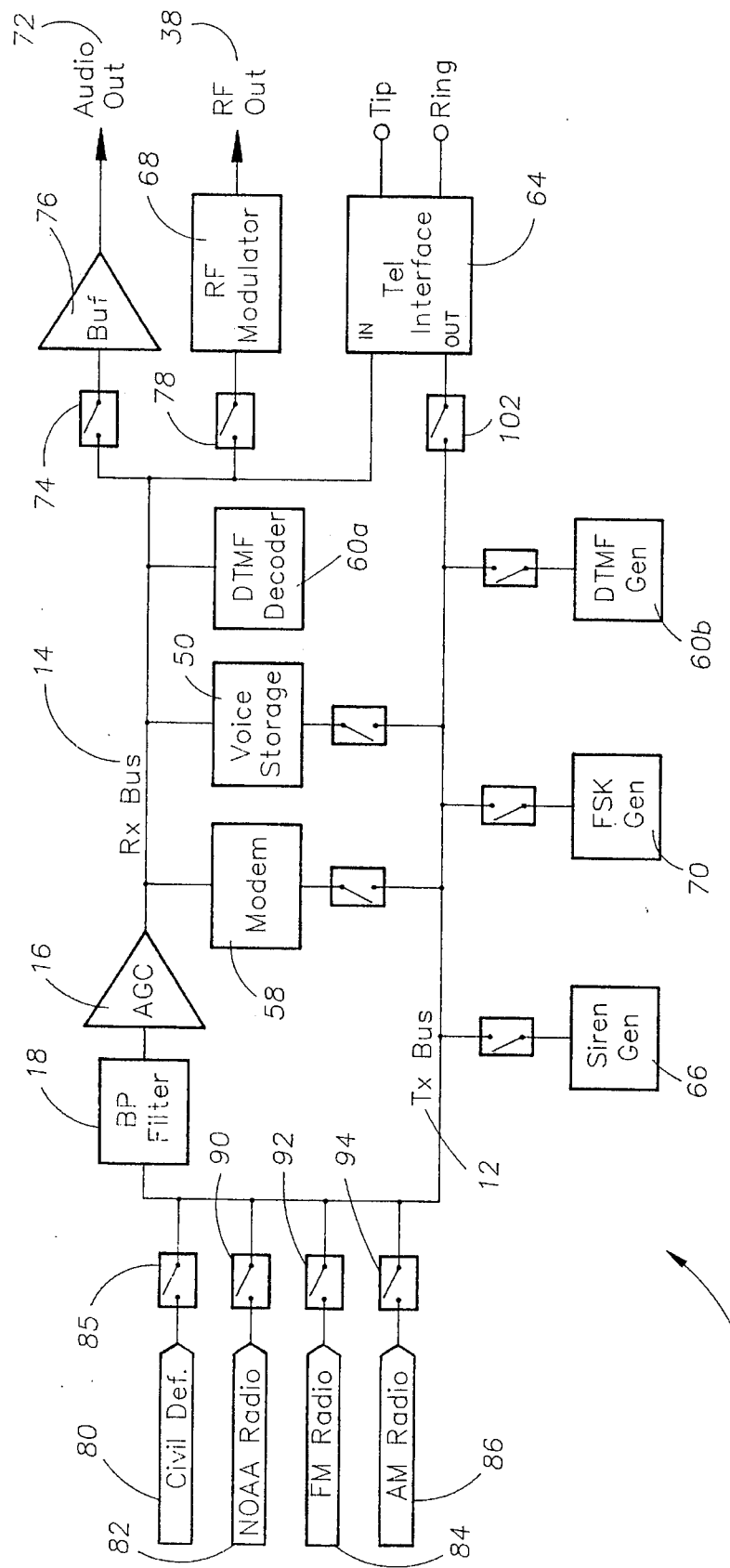
FIG. 3 is a block diagram of the multiple input processor audio bus system.

The multiple input processor of the present invention includes a common audio input bus 12 and output bus 14, as shown in FIG. 3. Buses 12 and 14 will interface all voice/audio frequency signals for various switching activities, which allows the MIP unit to perform all necessary functions. It is foreseen that the buses 12 and 14 could be doubled to allow for dual signal operations occurring at the same time.

On the output bus, a computer controlled automatic gain control 16 keeps signal levels at the optimum for each circuit connected to the bus. A bandpass filter 18 is connected to the output bus to screen out signals not in the audio range of 300 Hz–3,000 Hz.

Figure 4:
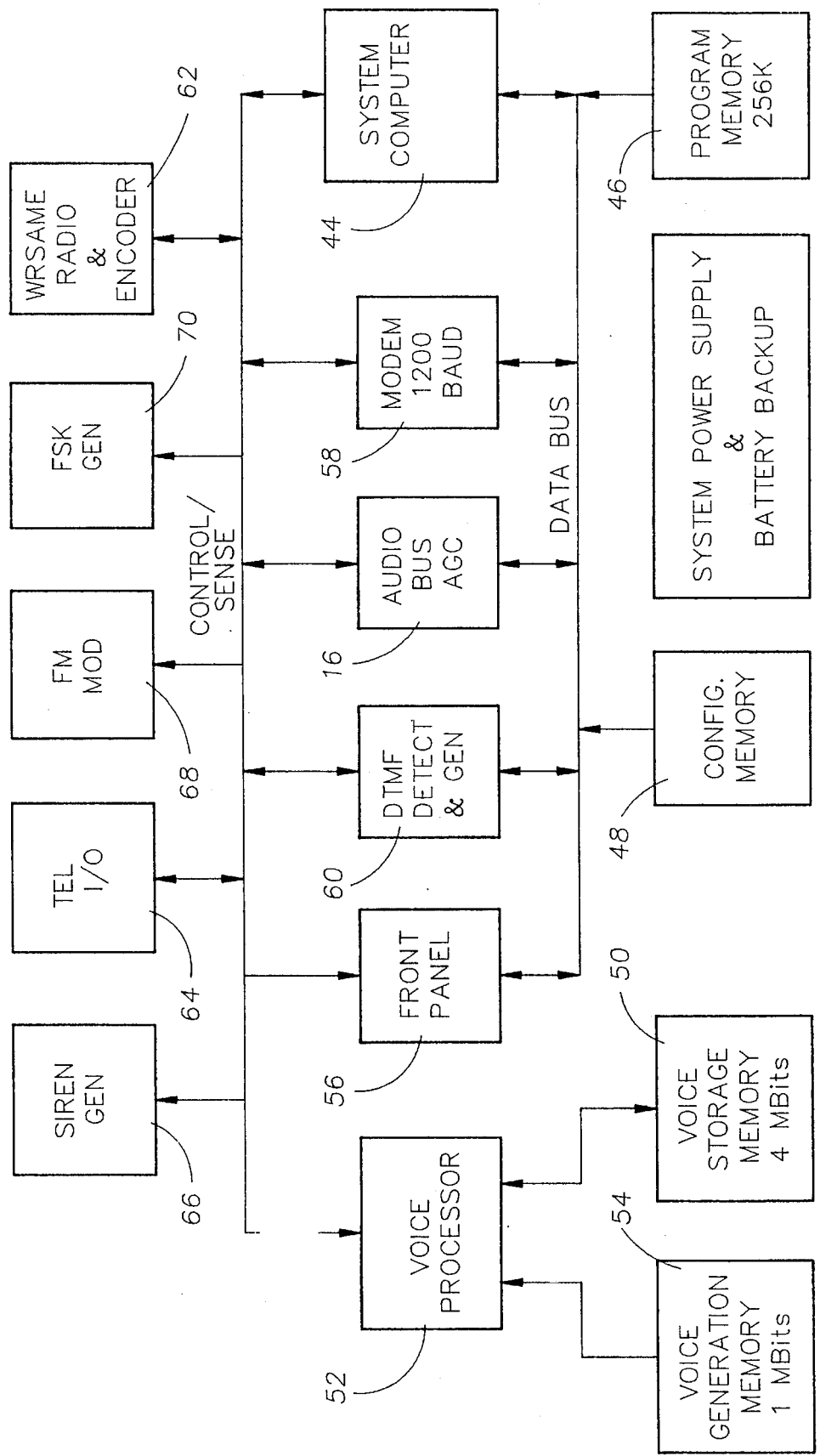
FIG. 4 is a block diagram of the MIP command/control system.

Referring now to FIG. 4, the MIP unit 10 will be controlled by a microcomputer 44. The instruction set for the microcomputer will be stored in programmable memory 46. The configuration memory 48 is nonvolatile reprogrammable memory which will hold data that describes the configuration features of the MIP unit. Such features would include any passwords assigned for access to the unit, telephone numbers, audit report times, etc.

Voice storage 50 will store voice audio in a digital memory for later play back. Preferably, the memory will be of a size to hold at least two minutes of stored voice data. Voice processor 52 utilizes the processing function of voice storage with stored words and phrases in memory to allow the MIP unit to "speak" words in short sentences. The voice processing function utilizes voice generation memory and voice storage memory to produce and issue warning statements, give system status, or provide other types of information.

The front panel controls 56 (described in more detail hereinabove) are connected to a data bus in the command control system with the system computer 44, a modem 58, the audio bus AGC 16, and a DTMF decoder and generator 60. A WRSAME radio and encoder 62 and telephone interface 64 are interconnected to permit transmittal or receipt of information from system computer 44, modem 58, audio bus AGC 16, and DTMF detection and generator 60. Voice processor 52, front panel controls 56, a siren generator 66, an RF modulator 68, and an FSK generator 70 are each capable of receiving output from the system computer 44, modem 58, audio bus AGC 16, DTMF detector and generator 60, telephone interface 64, and WRSAME radio and encoder 62, as shown in FIG. 4.

Referring again to FIG. 3, the MIP unit 10 is provided with an audio speaker designated as Audio Out 72 from the audio output bus 14 through a switch 74 and buffer 76. Speaker 72 monitors audio signals from the audio bus, and signal selection is controlled by the microcomputer 44 (see FIG. 4) with input from the user via the front panel controls 56.

The RF modulator 68 is connected to the audio output bus through a switch 78 and converts the signal to a radio frequency signal that is broadcast through a cable television system via RF output 38 (also shown in FIG. 2).

Figure 5:
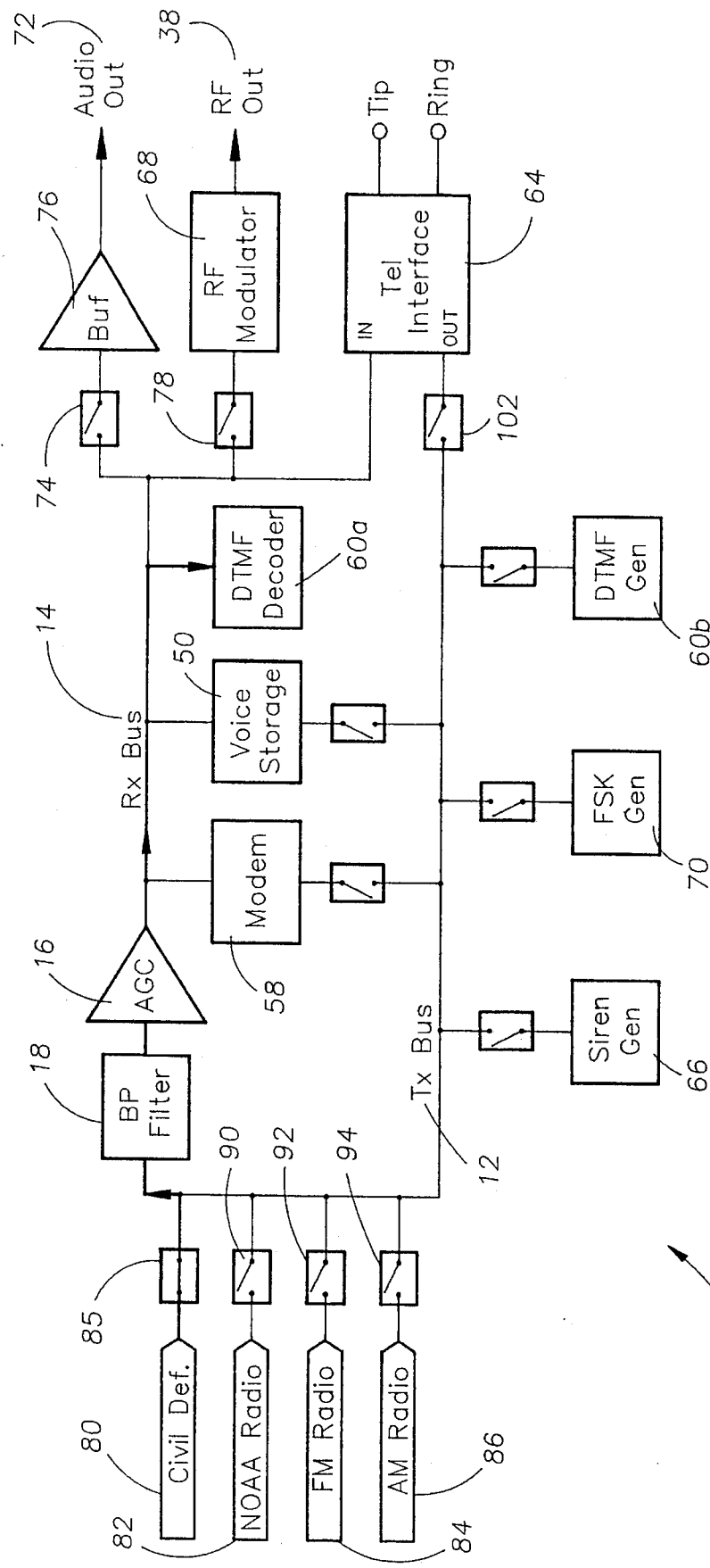
FIG. 5 is a block diagram of the MIP audio bus system showing input of a civil defense radio input command.
Figure 6:
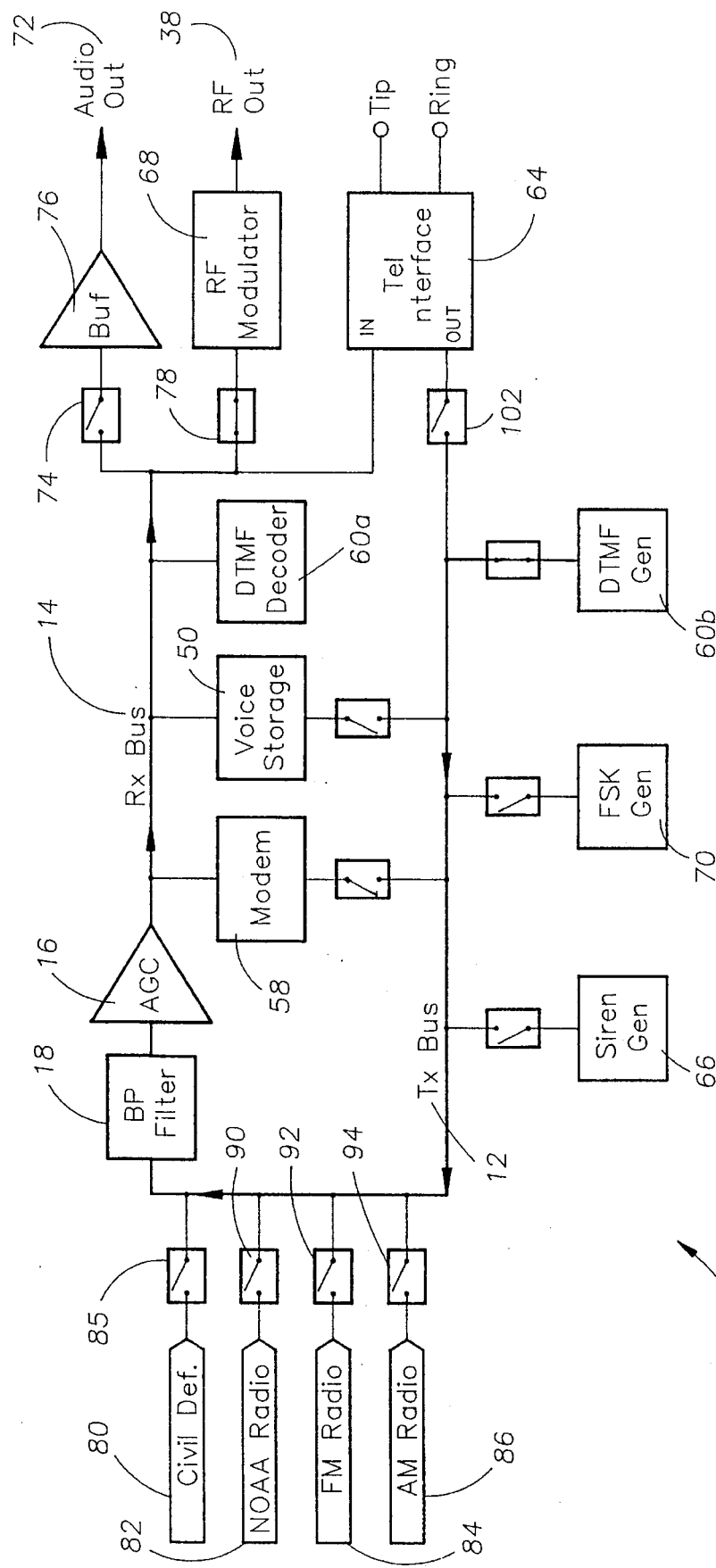
FIG. 6 is a block diagram of the MIP audio bus system showing transmission of DTMF codes to subscribers.

As described above, the primary function of MIP unit 10 is to receive alarm activation inputs from multiple sources and then to transmit the alarm via a cable TV network using FM modulation and DTMF tone techniques. As shown in FIG. 3, four audio inputs 80, 82, 84 and 86 are connected to the audio bus system through switches 88, 90, 92 and 94, respectively. Audio input 80 includes a radio receiver tuned to the local civil defense frequency. The audio output of this radio will be interfaced to the MIP unit's audio bus through switch 88. Audio output from the civil defense radio 80 may be utilized in several different ways. First, DTMF command codes will be received and decoded, as shown in FIG. 5, for proper access and activation of specific alarm functions. FIG. 6 shows the transmission of DTMF codes to subscriber decoders to communicate the type of alarm being transmitted. Various DTMF codes will be available for use in communicating various types of additional information to the subscriber decoders.

Figure 7:
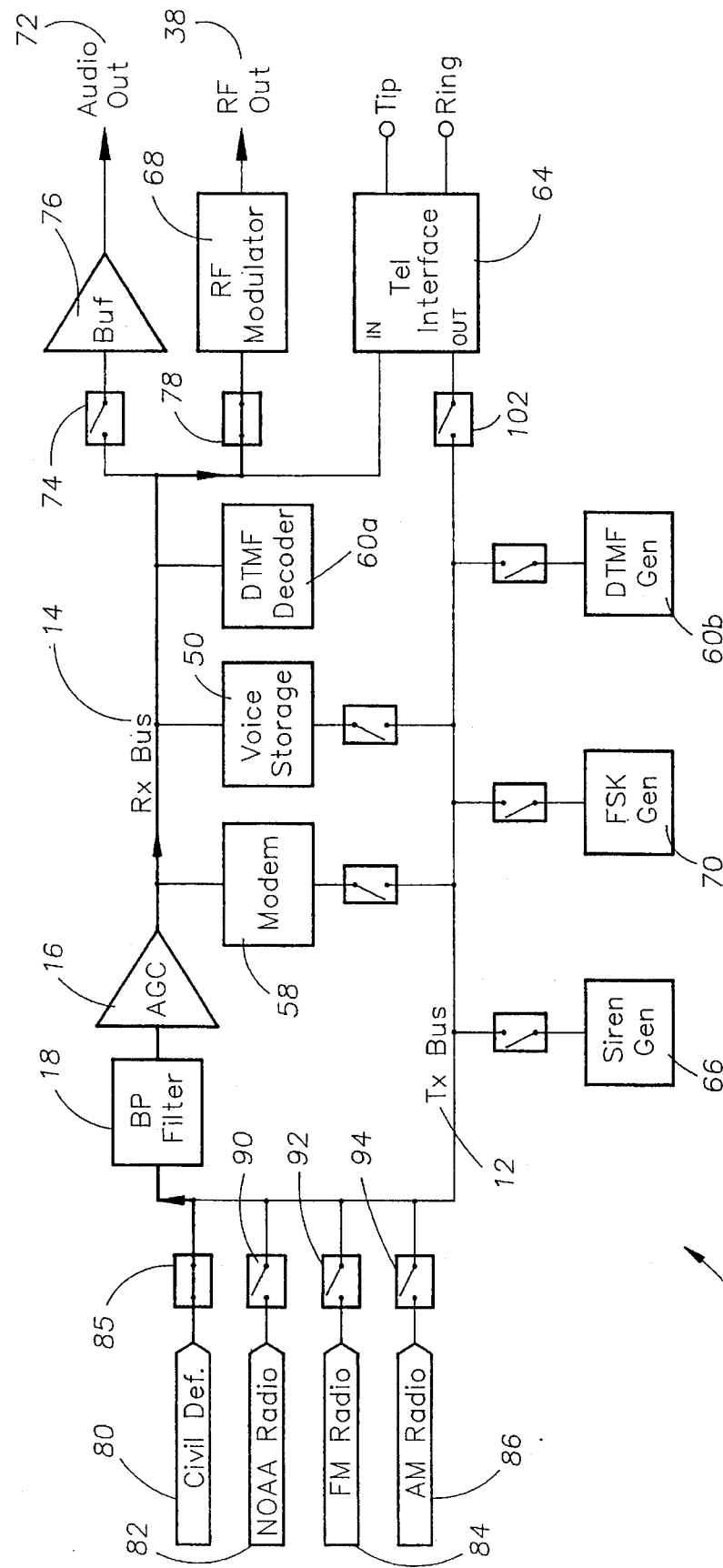
FIG. 7 is a block diagram of the MIP audio bus system showing output of a civil defense announcement to voice storage and to a subscriber.
Figure 8:
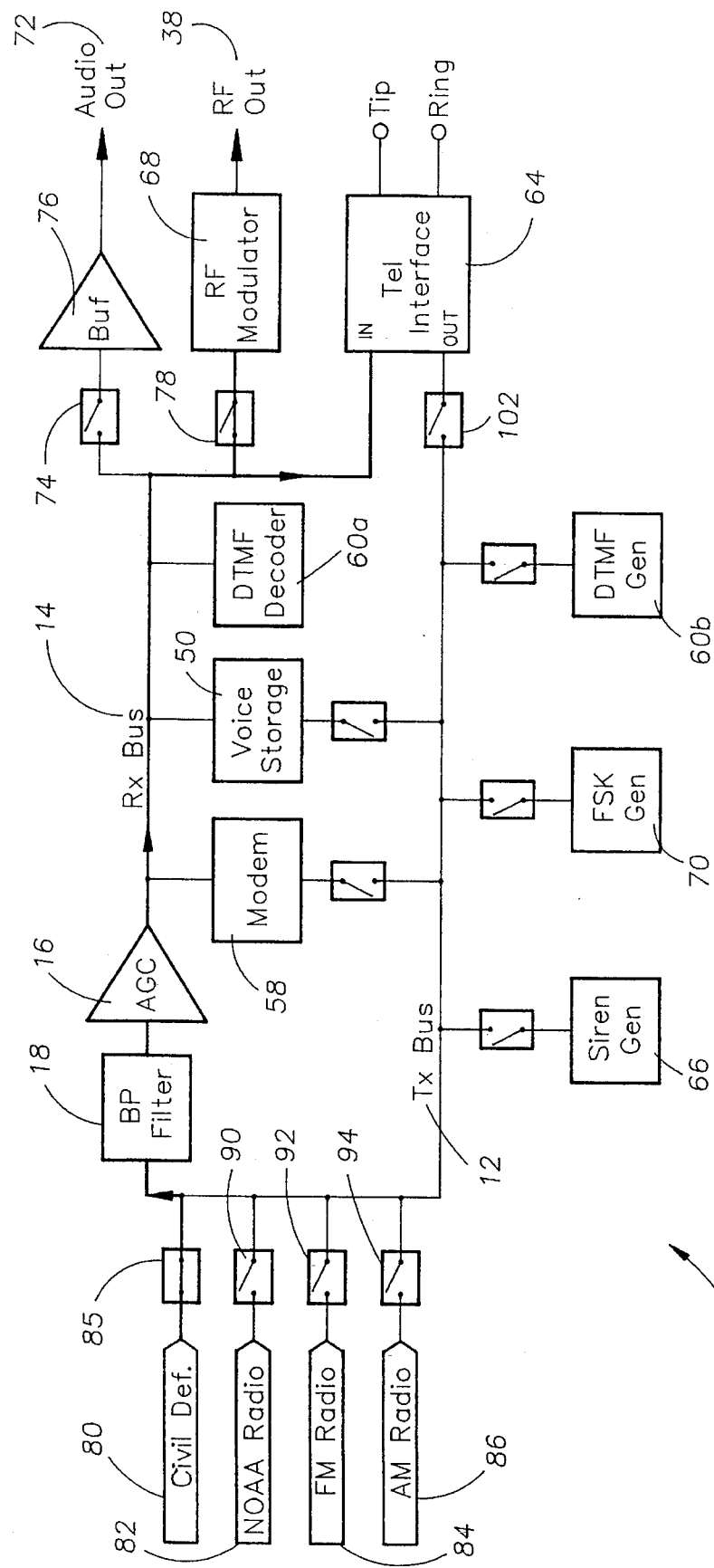
FIG. 8 is a block diagram of the MIP audio bus system showing a civil defense test transmission.
Figure 9:
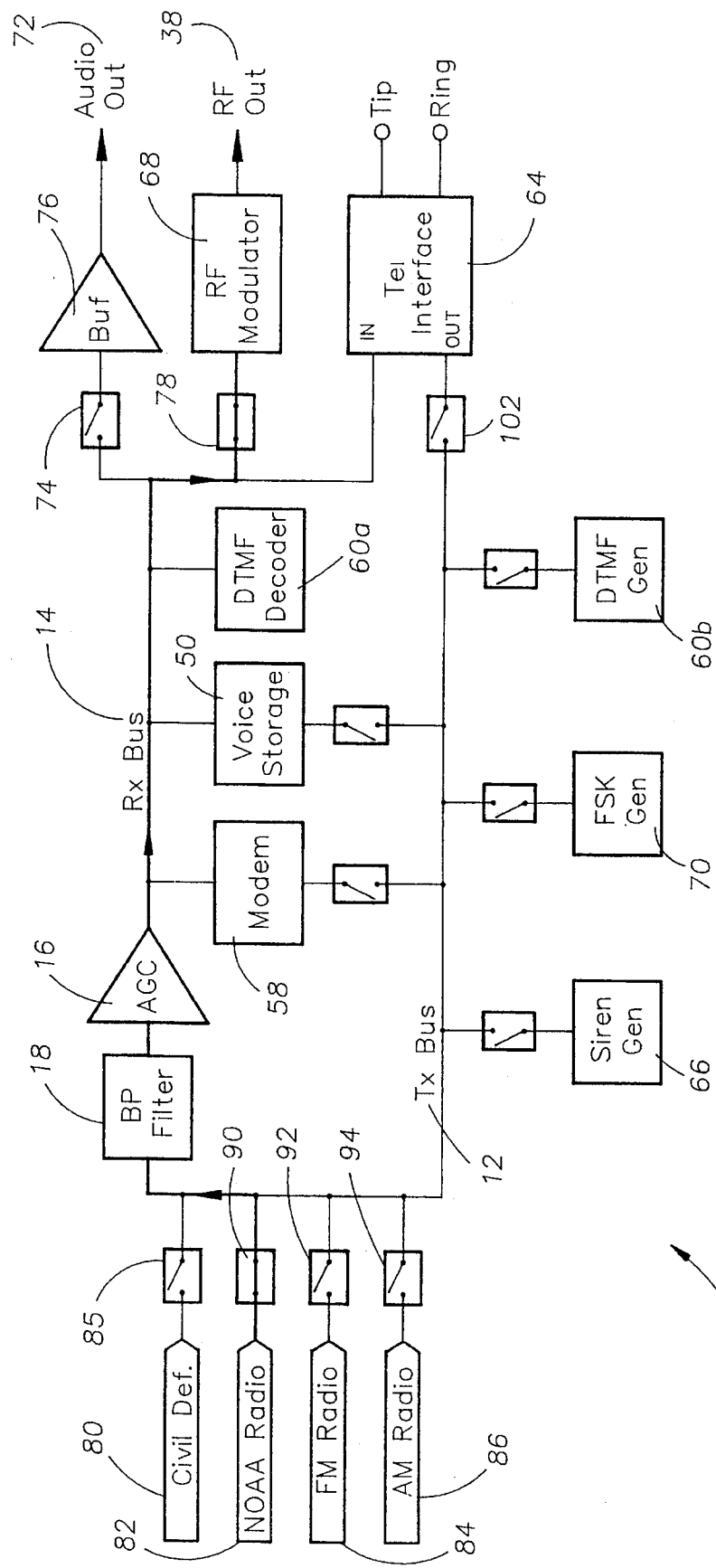
FIG. 9 is a block diagram of the MIP audio bus system showing a voice message announcement received through NOAA weather radio input and transmitted to voice storage and to subscribers.

FIG. 7 shows two different functions. First, audio announcements concerning specific warnings and/or messages can be transmitted directly to subscribers through RF modulator 68 and RF output 38. In addition, these audio announcements may be stored in voice storage 50 (see also FIG. 4) for future use. Testing of the civil defense circuitry and transmission system may be accomplished through transmission of a civil defense signal directly to the telephone interface 68, thereby avoiding the necessity of transmitting the civil defense testing procedure to subscribers, as shown in FIG. 8.

Figure 12:
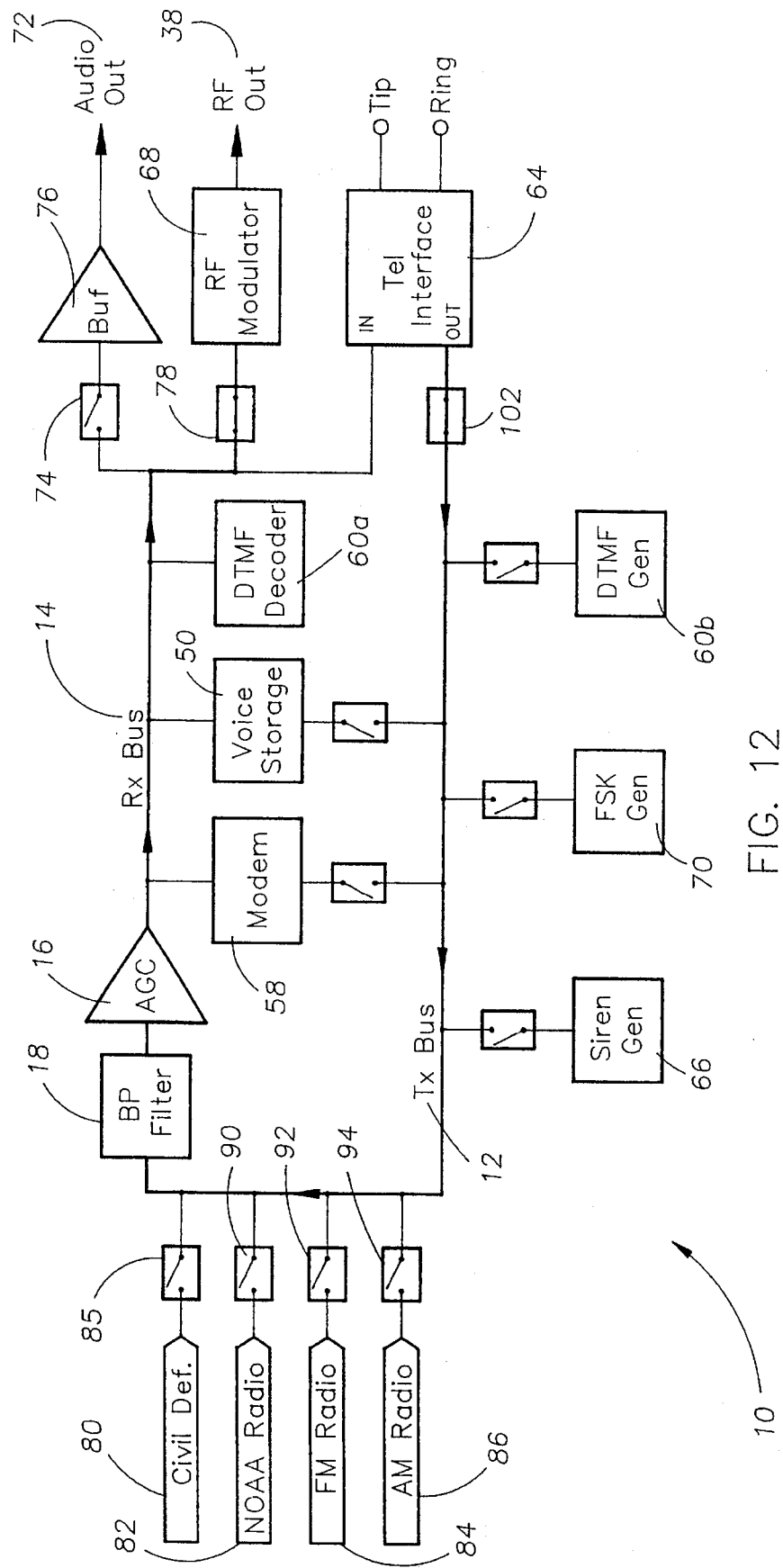
FIG. 12 is a block diagram of the MIP audio bus system showing transmission of a telephone interchange real time message alert to subscribers.

Similarly, the MIP unit will contain a VHF radio receiver 82 tuned to the local NOAA weather radio frequency. The audio output of this radio will be interfaced through the MIP audio bus via switch 90 in a manner similar to the civil defense audio output. As shown in FIG. 12, audio announcements concerning specific warnings can be transmitted directly to subscribers through modulator 68 and RF output 38 or stored in voice storage 50 for future use. WRSAME messages may also be received and decoded through detector and encoder 62 (see FIG. 4) for proper activation of specific alarm functions.

Figure 10:
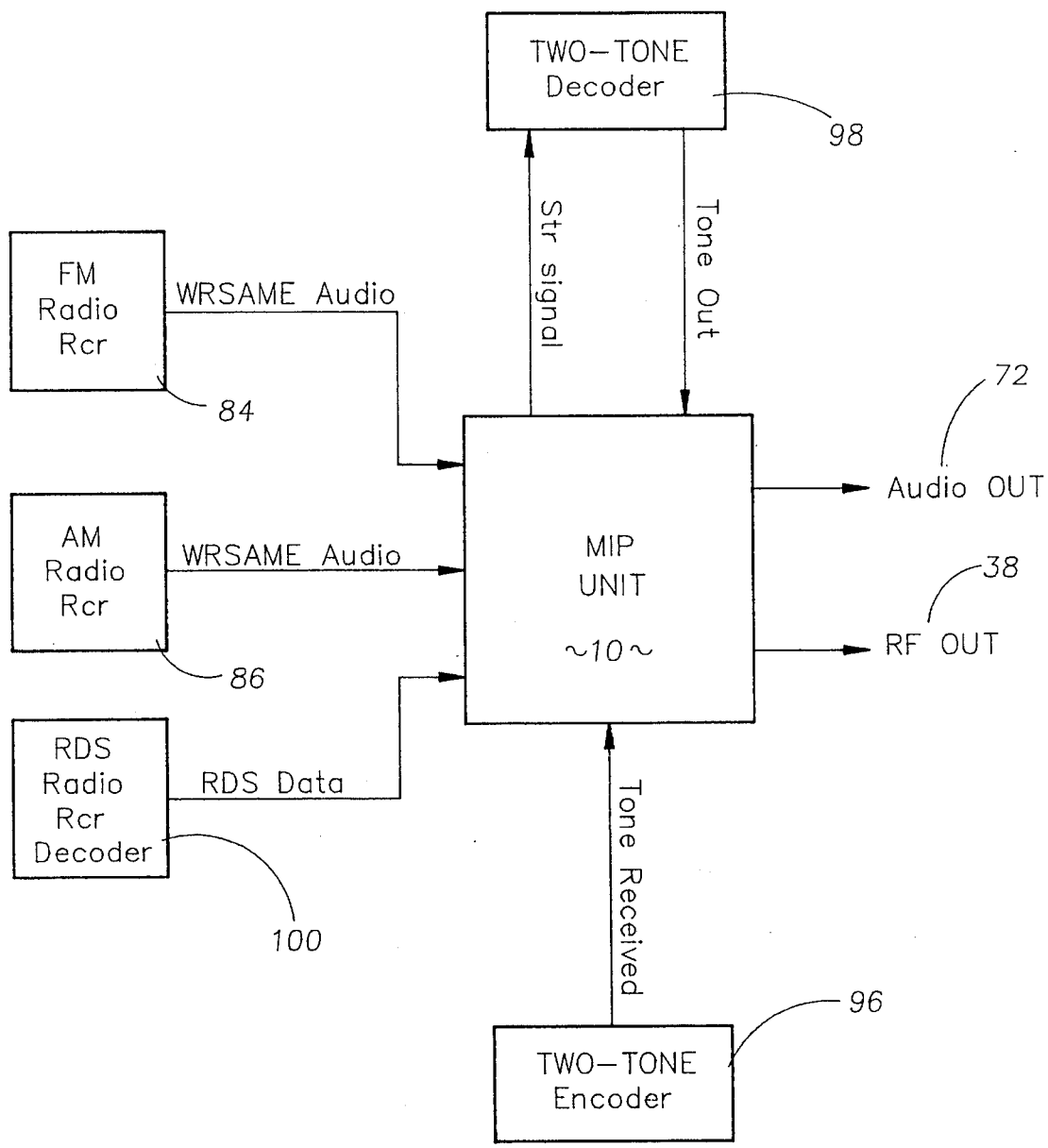
FIG. 10 is a block diagram of the MIP federal communication commission system configuration.

Preferably, the MIP unit will also contain an FM radio receiver 84 and an AM radio receiver 86, as shown in FIG. 3. The MIP unit includes an emergency broadcast system two-tone encoder interface 96, as shown in FIG. 10, that will trigger the encoder for operation upon receipt of a WRSAME audio signal from one of receivers 84 or 86. Two-tone encoder 96 will receive the audio output from receivers 84 and 86 for switching on to a common audio output port 72 and/or 38 on the MIP unit 10. This permits the MIP unit to be implemented as an FCC emergency broadcast system device. As shown in FIG. 10, the MIP unit will also have an EBS two-tone decoder interface 98 that will sense a signal from the encoder 96 indicating a received EBS alert signal.

FIG. 10 also shows an RDS radio receiver and decoder which includes a digital data input interface to receive and process RDS coded messages for transmission to a subscriber.

Figure 11:
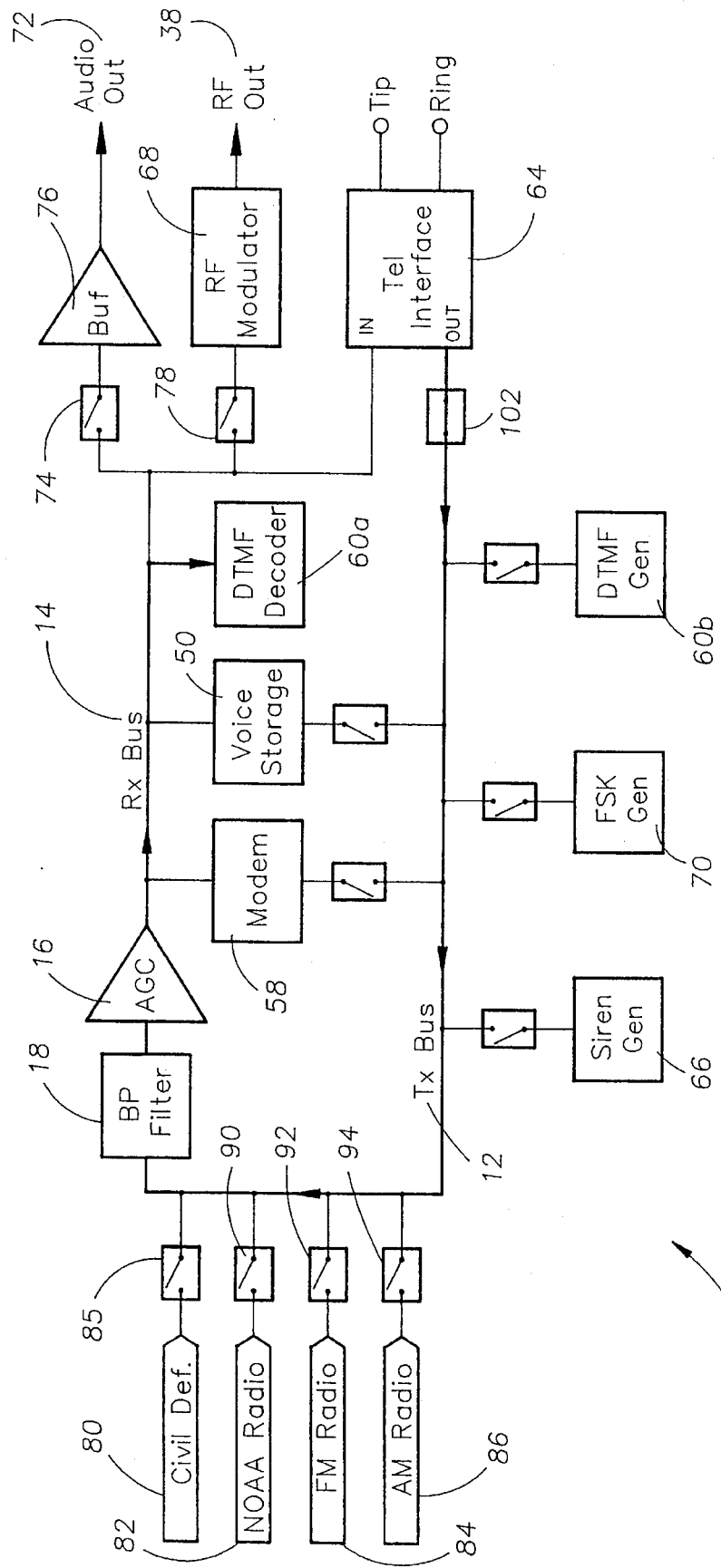
FIG. 11 is a block diagram of the MIP audio bus system showing input of DTMF commands from a telephone interface.
Figure 13:
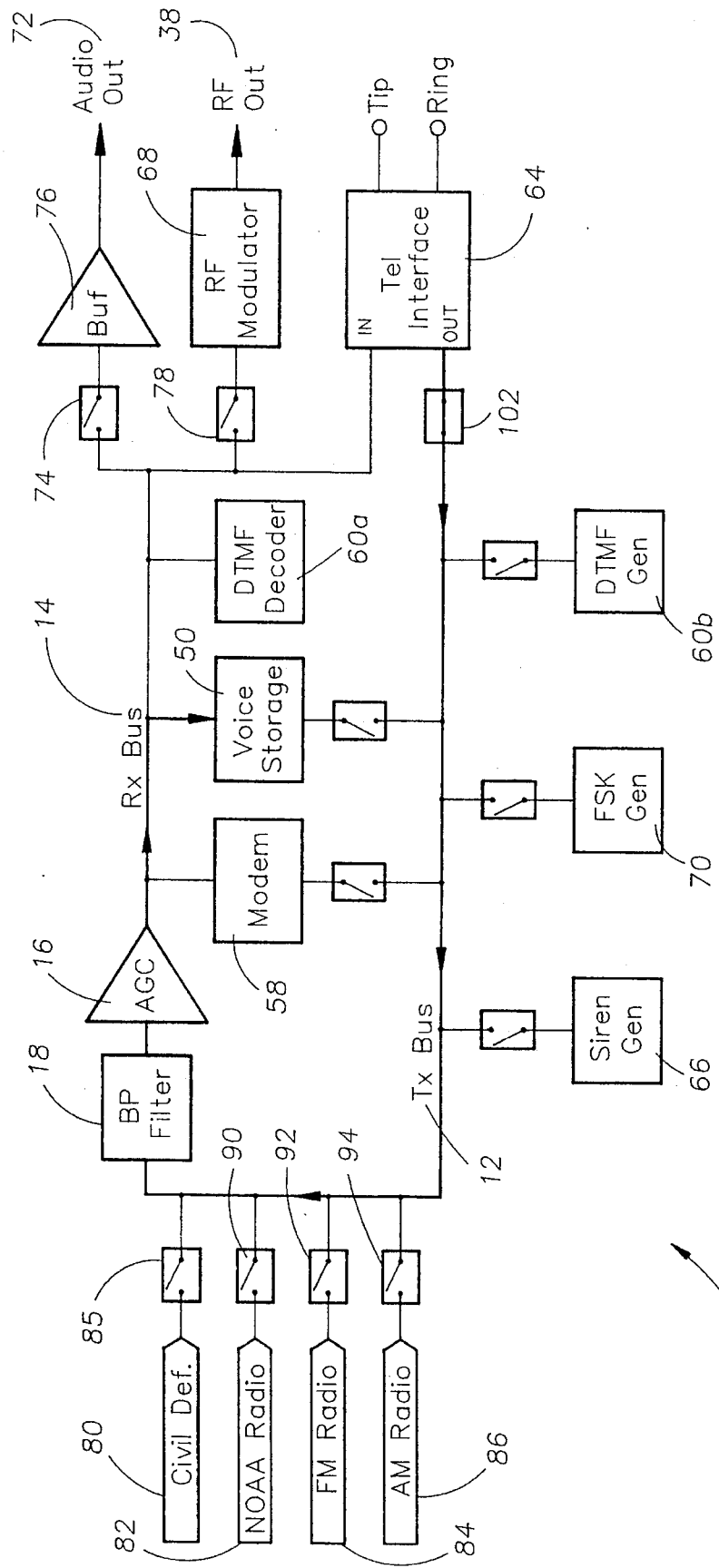
FIG. 13 is a block diagram of the MIP audio bus system showing transmission of a telephone interface voice message to voice storage.
Figure 14:
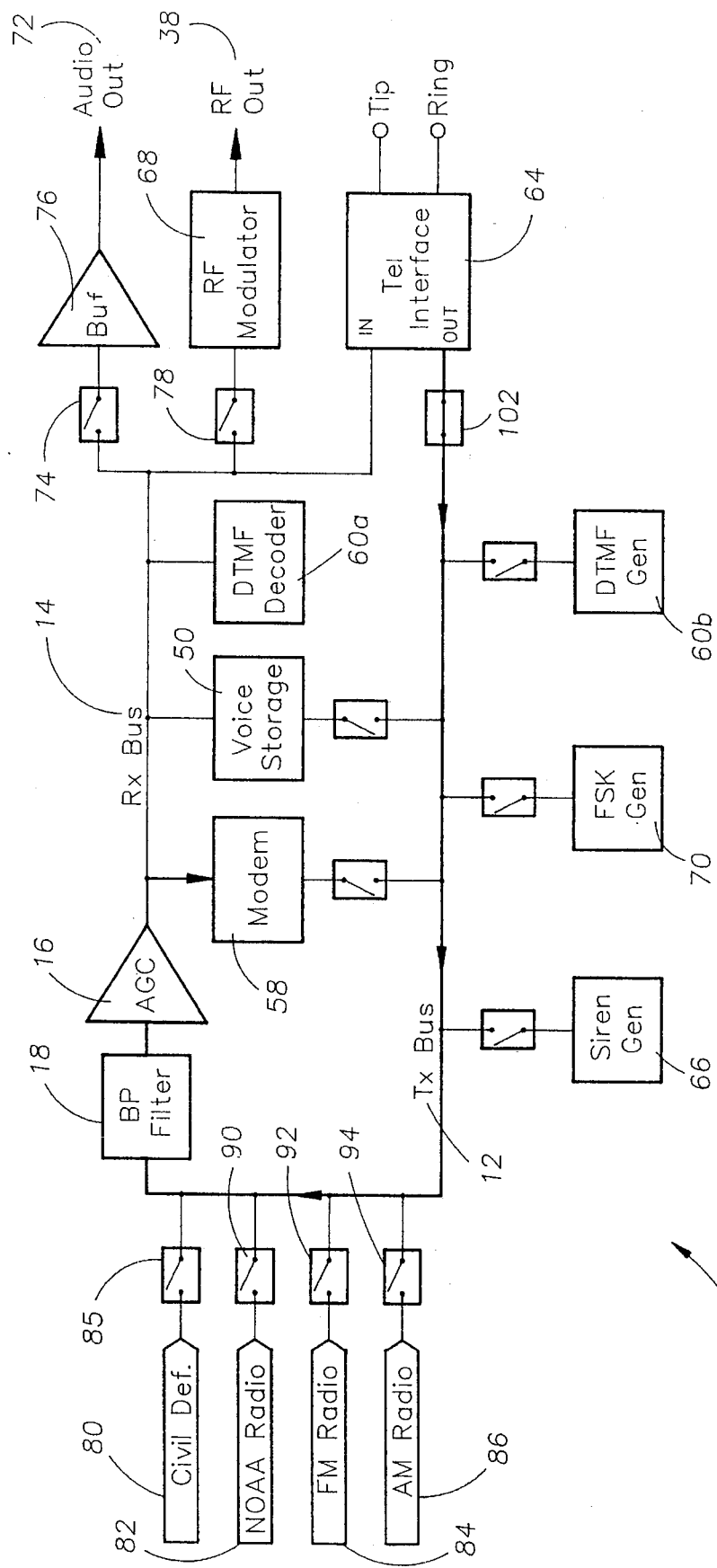
FIG. 14 is a block diagram of the MIP audio bus system showing transmission of a telephone interchange command to the modem input.

As shown in FIG. 3, the MIP unit contains a standard telephone interface 64 that can be called by anyone dialing the correct number for the unit. The audio output from the telephone circuit is interfaced through switch 102 with the MIP unit's audio bus. As shown in FIG. 11, DTMF command codes may be received and decoded from telephone interface 64 for proper access and activation of specific alarm functions. In addition, audio announcements concerning specific warnings and other messages can be directly transmitted to subscribers through modulator 68 as shown in FIG. 12. The audio output from the telephone circuit may also be transmitted directly to voice storage to store announcements for future use, as shown in FIG. 13. Finally, telephone interface 64 may also be utilized to access modem 58 as shown in FIG. 14 to allow for communications with a PC type computer utilizing off-the-shelf modem software. The modem thereby permits restricted access to the system computer 44 of MIP unit 10.

Figure 15:
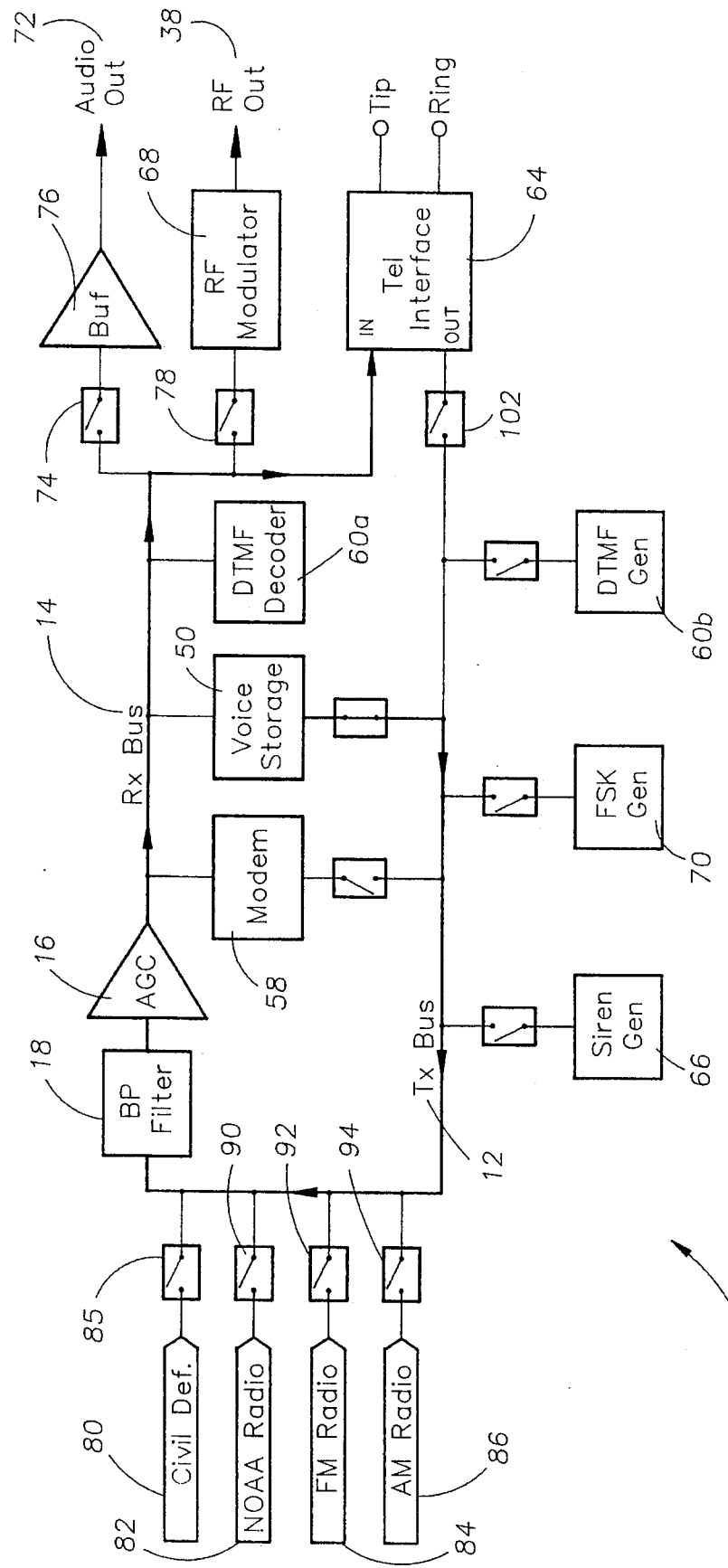
FIG. 15 is a block diagram of the MIP audio bus system showing output of recorded voice message to telephone interchange.
Figure 16:
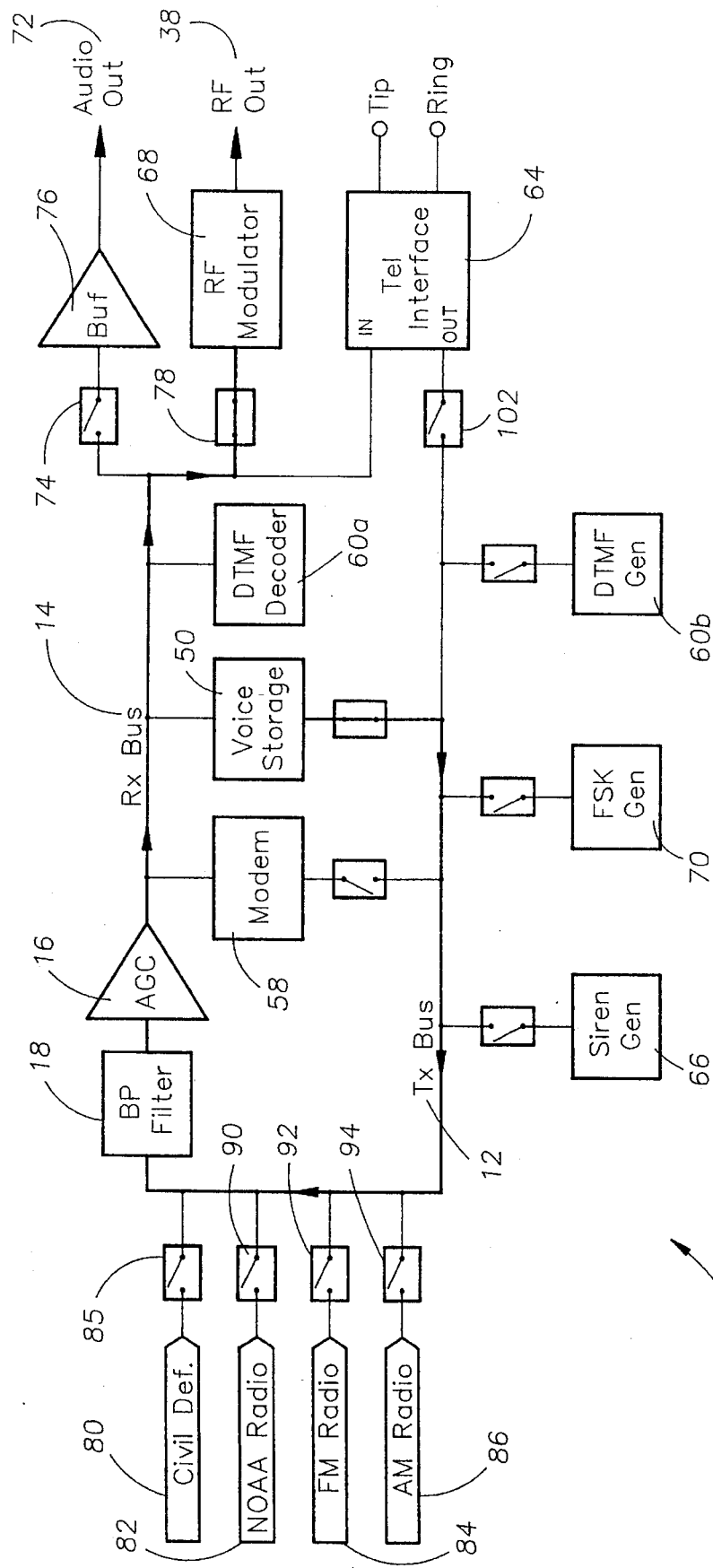
FIG. 16 is a block diagram of the MIP audio bus system showing transmission of stored voice messages to the subscriber.

As discussed above, voice messages may be received and transmitted through both the telephone interface 64 and the civil defense radio input 80. However, it should be noted that the telephone service and the radio service must have DTMF capability in order to operate these features. The voice message storage 50 has the capability for digitally storing voice messages for later playback through telephone interface 64, as shown in FIG. 15, or through modulator 68 to subscribers, as shown in FIG. 16. The voice message storage function will have a set of commands in the form of DTMF codes. Possible commands include: (1) record; (2) stop; (3) playback; (4) repeat; (5) cancel; (6) start time; and (7) stop time.

Figure 17:
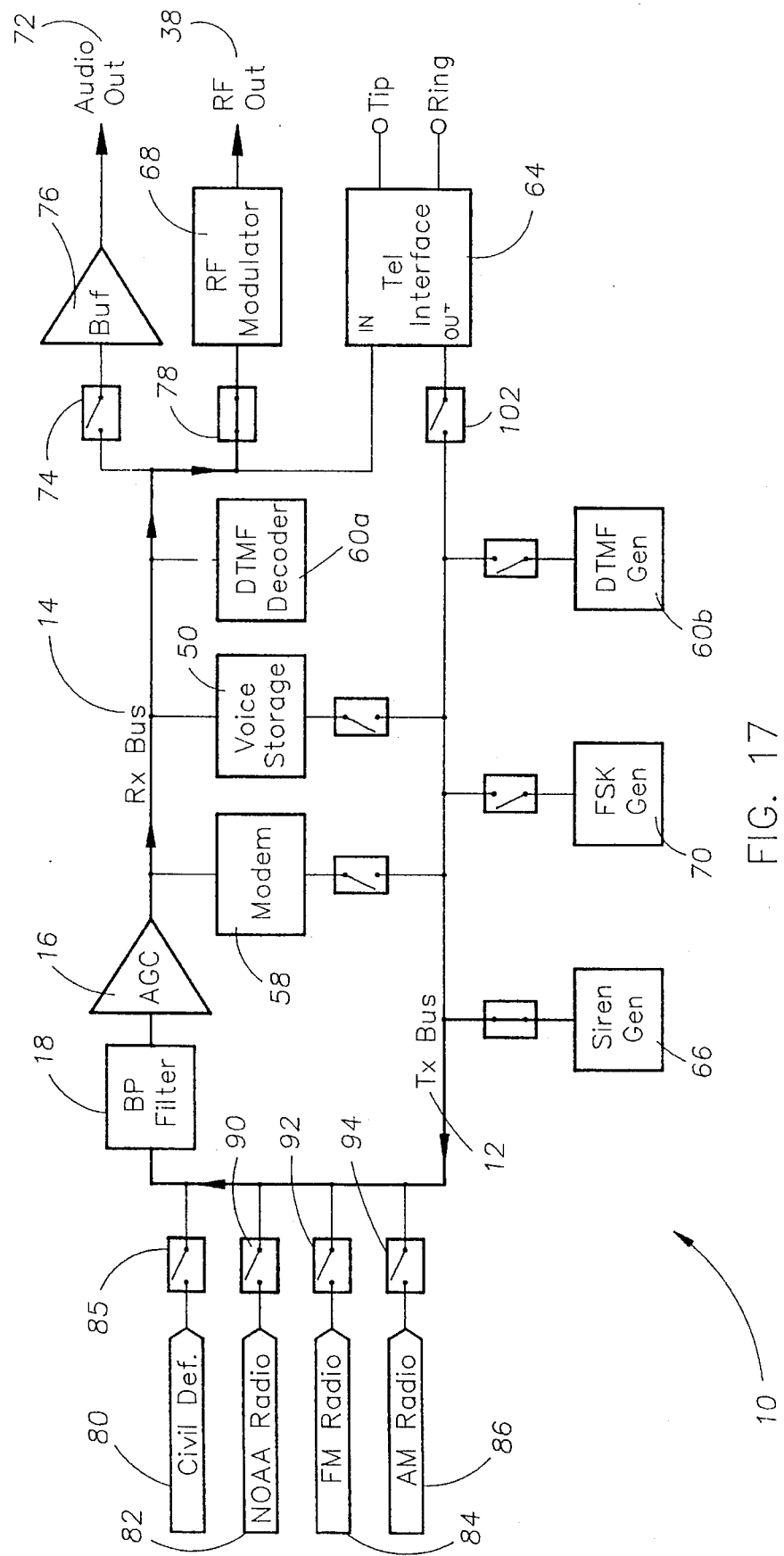
FIG. 17 is a block diagram of the MIP audio bus system showing the generation and transmission of a specific audio siren sound to subscribers.
Figure 18:
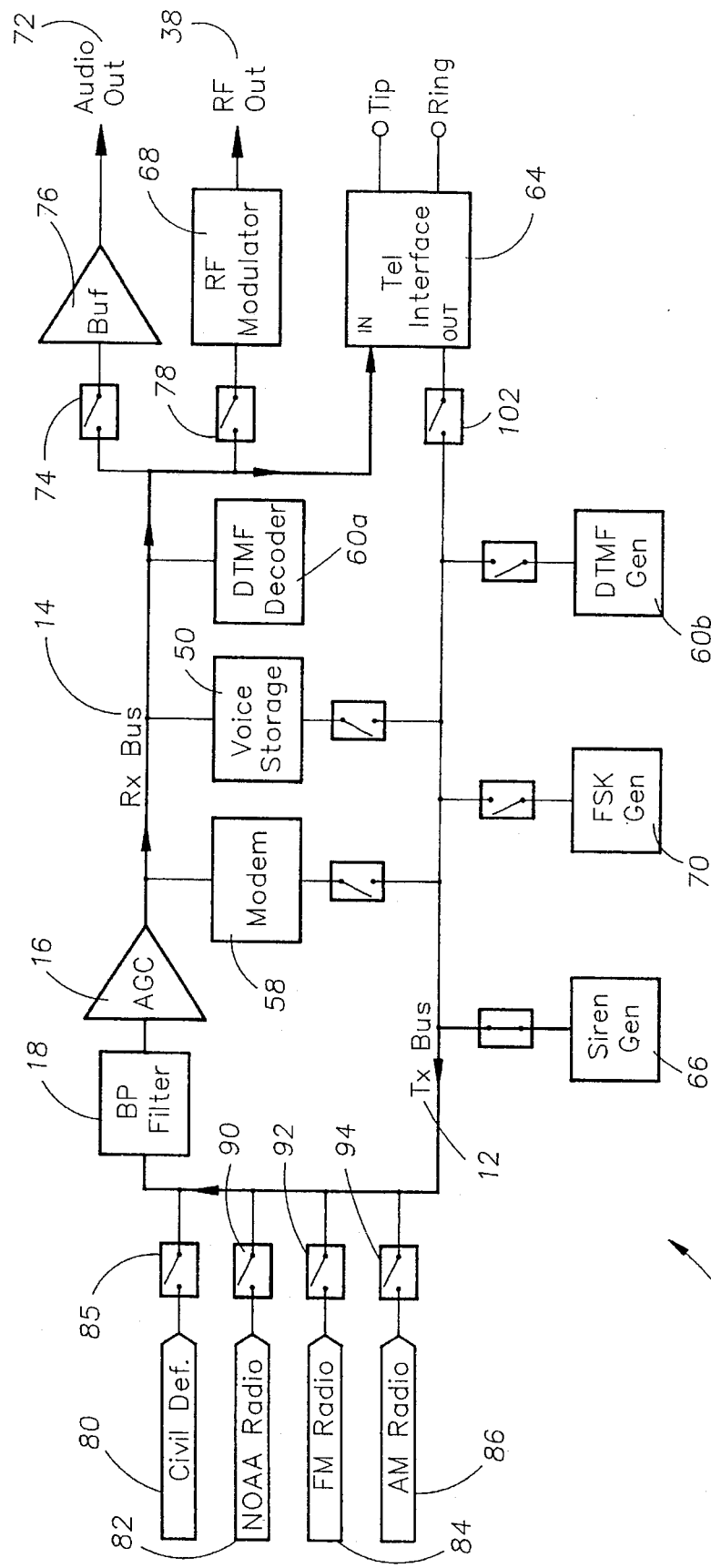
FIG. 18 is a block diagram of the MIP audio bus system showing output of siren alarm to telephone interchange.
Figure 19:
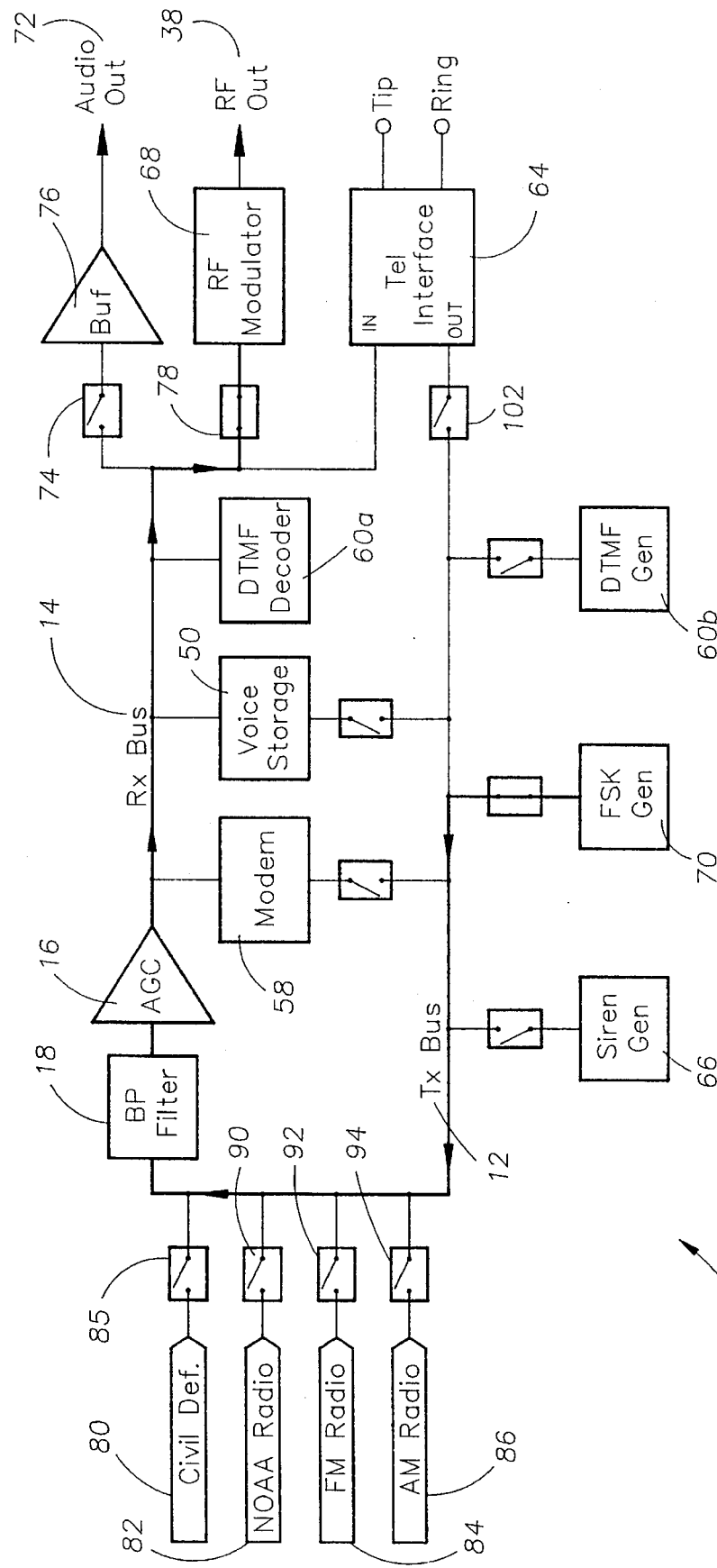
FIG. 19 is a block diagram of the MIP audio bus system showing transmission of frequency shift keying commands to a subscriber.
Figure 20:
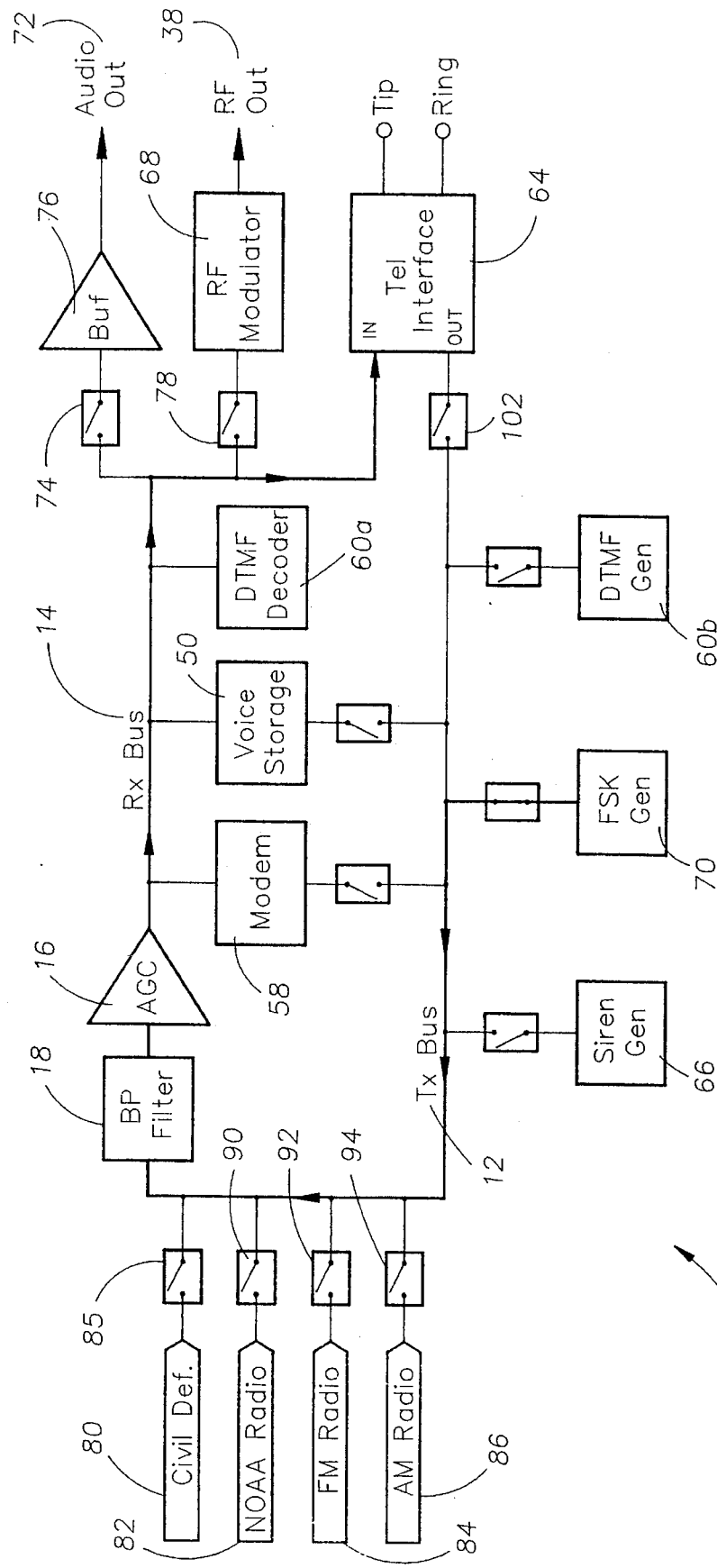
FIG. 20 is a block diagram of the MIP audio bus system showing transmission of FSK commands to telephone interchange.

Once an alarm event has been activated, MIP unit 10 will transmit in proper sequence the alarm codes, an appropriate alarm signal, and an appropriate audio announcement to subscriber decoders. Two types of alarm signals are contemplated: a "watch" signal and a "warning" signal. Each signal has its own command codes and alarm protocol to be used when transmitted. The "watch" signal is the less serious of the two alarm types, and its purpose is to alert the subscriber of the potential for dangerous situations or to provide them with important information that is not in the form of a warning. The siren is not utilized with a "watch" signal. The "warning" signal is utilized to warn a subscriber of a real and present danger, and therefore the siren is utilized to alert the subscriber. The siren generator 66 may be directly connected to the audio bus to transmit the specific audio siren sound to subscriber decoders as shown in FIG. 17, or to output the siren signal to telephone interchange 64 as shown in FIG. 18. Similarly, FSK generator 70 may be transmitted directly to a subscriber decoder, as shown in FIG. 19, or to telephone interchange 64 as shown in FIG. 20.

Figure 21:
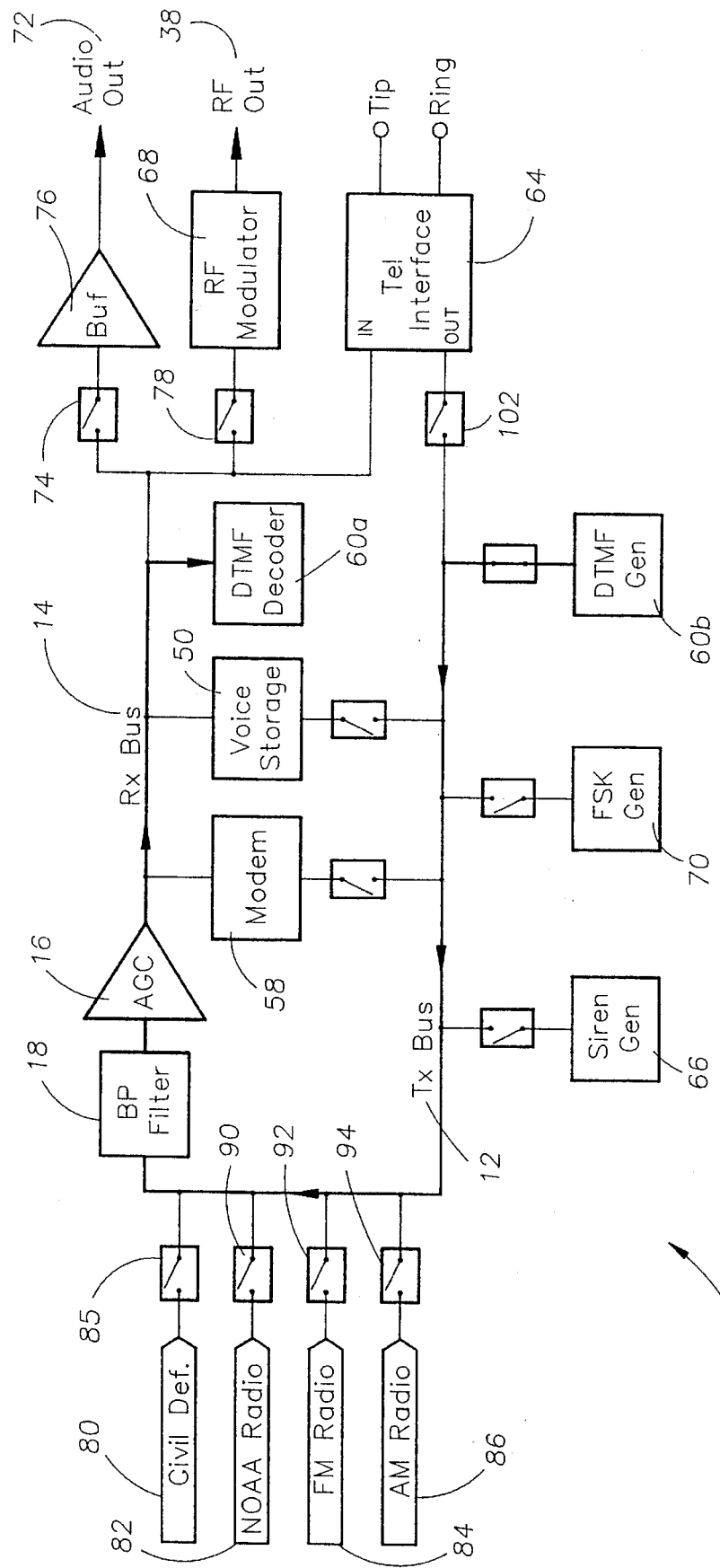
FIG. 21 is a block diagram of the MIP audio bus system showing a DTMF to DTMF test procedure.
Figure 22:
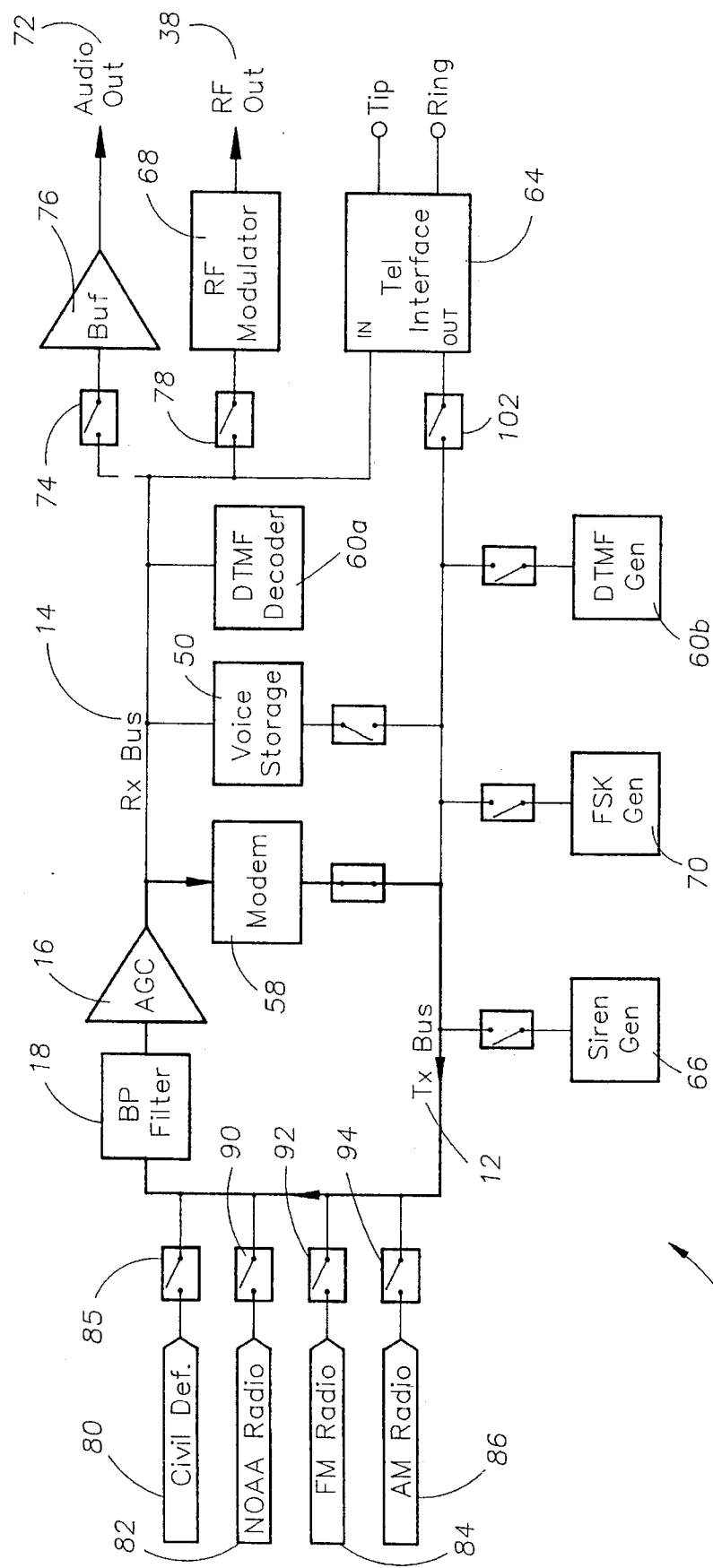
FIG. 22 is a block diagram of the MIP audio bus system showing a modem to modem test transmission.
Figure 23:
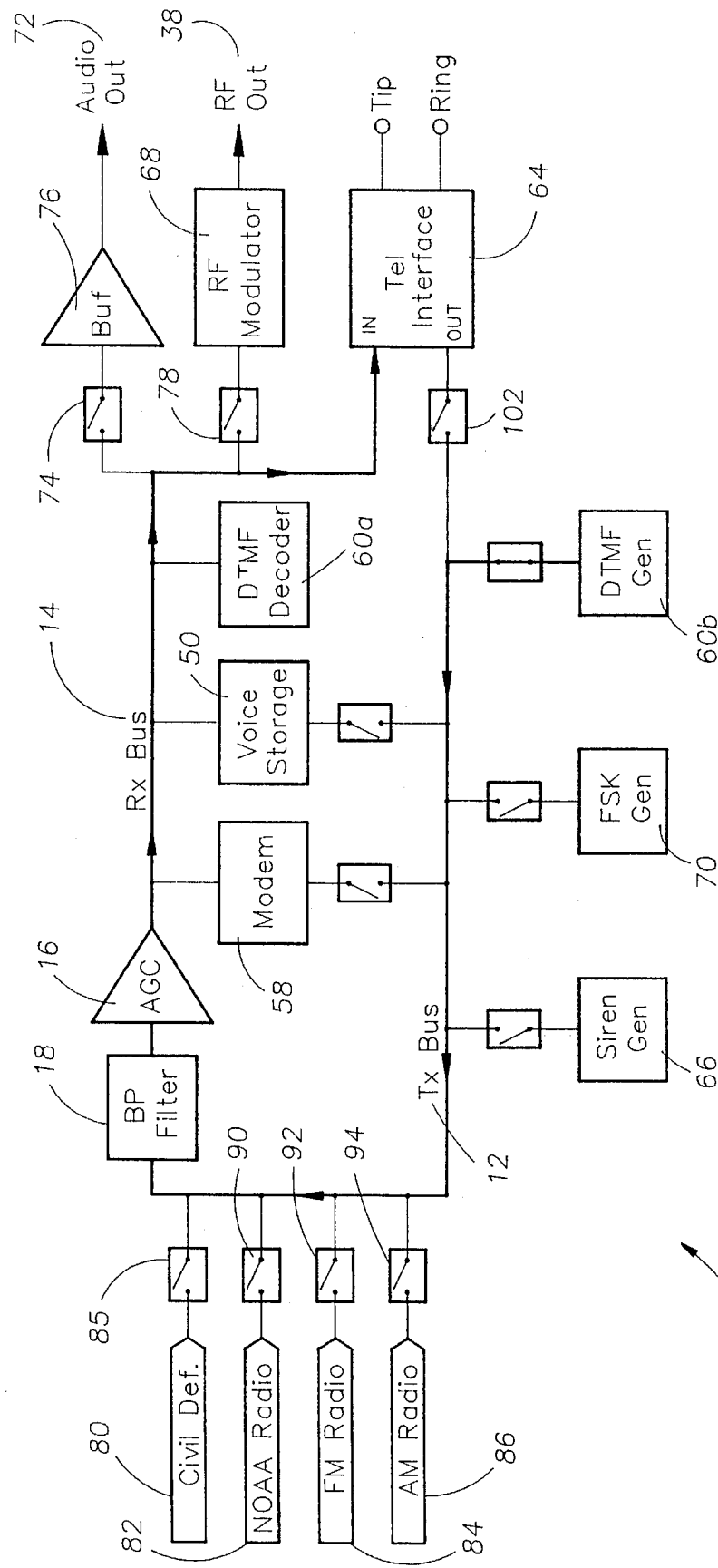
FIG. 23 is a block diagram of the MIP audio bus system showing output of DTMF commands to telephone interchange.

The MIP unit 10 will continuously monitor various subsystem operations to isolate and report any malfunctions that might occur. The system's self-testing is accomplished by the control system computer 44, shown in FIG. 4, and diagnostic software. Examples of monitoring points are: (1) battery condition; (2) RF signal strength to radio inputs; (3) voice memory condition; (4) primary power condition; (5) telephone interface condition; (6) DTMF signaling condition; (7) analog bus condition; (8) modem operation; (9) voice processing operation; and (10) audio inputs signal strength. A DTMF to DTMF test is shown in FIG. 21, while a modem to modem test is shown in FIG. 22. DTMF signal condition can be analyzed by transmitting DTMF codes to telephone interface 64, as shown in FIG. 23.

Figure 24:
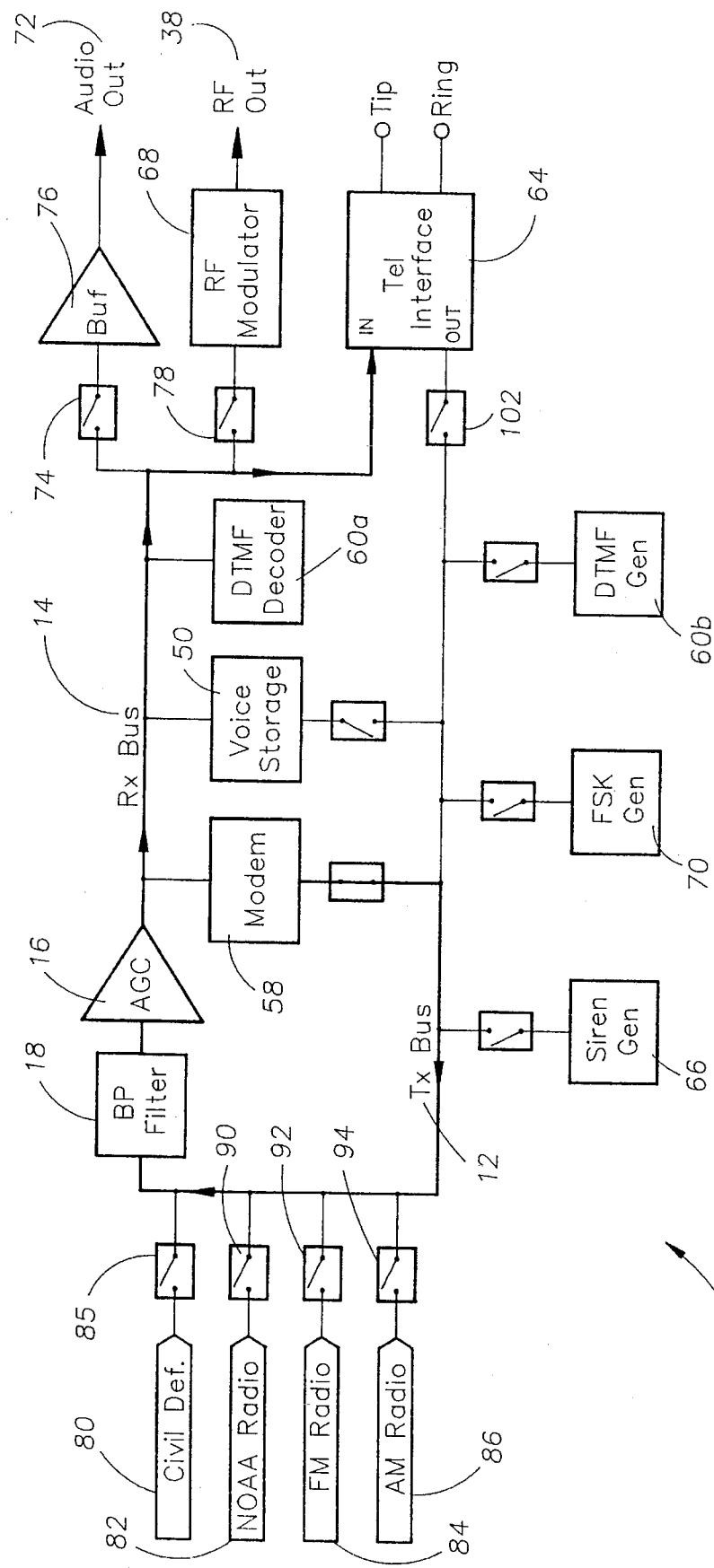
FIG. 24 is a block diagram of the MIP audio bus system showing output of modem signals to telephone interchange.

Reports on unit status, unit operations and other information will be available from the MIP unit to an outside system. The method of communications is via a standard modem 58 utilizing standard protocols. The telephone interface 64 will be the transmission media (see FIGS. 14 and 24). Routine reports giving system activity on a time and/or required basis will contain information on alarm activations, system access, system status and other similar routine information. In the event of a malfunction of the system, or other abnormal activity, unscheduled calls by the MIP unit to preselected telephone numbers will be possible, as shown in FIG. 24.

The functions of the MIP unit are implemented in software as much as possible. All control, processing and decision activities will be implemented in software in system computer 44 in order to allow for flexibility and future growth. For example, the creation of the siren signals will be done with software techniques. There will be three different sounding siren signals developed to be used for various purposes.

In addition, computer 44 will contain an alarm activation priority structure to properly select the most important alarm activation input in the event of simultaneous multiple input activations. Such a priority structure can be programmed to be both source-sensitive and signal-sensitive. For instance, a civil defense warning may be a type of source which is only utilized in the most important emergencies. In such a case, the civil defense source can be given higher priority to all other signal input sources. In another arrangement, the priority structure may be programmed so as to give priority to any "warning" signal over any other "watch" type signal, so as to immediately inform the subscribers of the greatest threat, regardless of source of the warning.

Whereas, this invention has been shown and described in connection with the preferred embodiment thereof, it will be understood that many modification, substitutions and additions may be made which are within the intended broad scope of the appended claims.

I claim:

1. A multiple input processor for a cable television system, said cable television system of a type including a head end and plurality of receivers for receiving radio frequency signals from said head end, said receivers including means for converting said radio frequency signals to audible audio signals, comprising:

a first signal source means for providing at least one audio signal input for transmission to said receivers, connected to an audio bus means;

a second signal source means for providing at least one audio signal input for transmission to said receivers, connected to said audio bus means;

programmable processing means connected to said audio bus means, for processing said audio signal inputs from said first and second sources and selectively transmitting the processed signals to a modulator means;

modulator means for receiving processed audio signals and converting them into a radio frequency signal for broadcast to said receivers; and voice storage means interfaced with said audio bus and said processing means, for storing audio signal inputs, said processing means programmed to selectively direct said audio signals to at least one of said voice storage means and said modulator means.

2. The multiple input processor of claim 1, further comprising telephone interface means connected to said audio bus and said processing means, for receiving and transmitting audio signals along a telephone line, said processing means programmed to selectively direct said audio signals to at least one of said voice storage means, modulator means and telephone interface means.

3. A multiple input processor for a cable television system, said cable television system of a type including a head end and plurality of receivers for receiving radio frequency signals from said head end, said receivers including means for converting said radio frequency signals to audible audio signals, comprising:

a first signal source means for providing at least one audio signal input for transmission to said receivers, connected to an audio bus means;

a second signal source means for providing at least one audio signal input for transmission to said receivers, connected to said audio bus means;

programmable processing means connected to said audio bus means, for processing said audio signal inputs from said first and second sources and selectively transmitting the processed signals to a modulator means; and modulator means for receiving processed audio signals and converting them into a radio frequency signal for broadcast to said receivers;

said first signal source means including a radio receiver set at a predetermined radio frequency for receiving a signal input and providing an audio signal to said processing means.

4. The multiple input processor of claim 3, wherein said second signal source means includes a radio receiver set at a second predetermined radio frequency for receiving a signal input and providing an audio signal to said processing means.

5. The multiple input processor of claim 4, further comprising:

a third signal source means for providing at least one audio signal input for transmission to said receivers, connected to said audio bus means;

said processing means including means for processing audio signal inputs from said third source and selectively transmitting the processed signals to said modulator means.

6. The multiple input processor of claim 5, wherein said third signal source means includes a telephone interface means connected to said audio bus and said processing means, for transmitting audio signals from a telephone line to said audio bus.

7. The multiple input processor of claim 2, wherein said first signal source means includes said telephone interface means, for transmitting an audio signal from a telephone line to said audio bus.

* * * * *